United States Patent [19]

Salensky

[11] 4,370,382

[45] Jan. 25, 1983

[54] MODIFIED ZINC-RICH COATINGS

[75] Inventor: George A. Salensky, Whitehouse Station, N.J.

[73] Assignee: Union Carbide Corporation, Danbury, Conn.

[21] Appl. No.: 160,940

[22] Filed: Jun. 19, 1980

[51] Int. Cl.³ ............................................. B32B 15/08
[52] U.S. Cl. ................... 428/418; 106/14.44; 106/292; 252/511; 252/512; 427/386; 523/451; 523/459; 523/466; 524/415; 524/434; 524/439; 525/481; 528/87
[58] Field of Search ..... 525/481; 260/37 M, 31.4 EP; 106/14.44, 292; 528/87; 428/418; 252/511, 512; 427/386

[56] References Cited

U.S. PATENT DOCUMENTS

| | | | |
|---|---|---|---|
| 2,713,565 | 7/1955 | Howard et al. | 260/31.4 EP |
| 3,123,582 | 3/1964 | Tryzna | 525/481 |
| 3,177,090 | 4/1965 | Bayes et al. | 525/481 |
| 3,207,611 | 9/1965 | Ehren | 106/14.44 |
| 3,446,770 | 5/1969 | King | 252/511 |
| 3,630,952 | 12/1971 | Nielsen | 106/292 |
| 4,157,924 | 6/1979 | Elms et al. | 427/386 |

OTHER PUBLICATIONS

Halox Pigments-Product Specification Sheet for Halox ®ZX-111 (Zinc Phosphosilicate).

Primary Examiner—John J. Gallagher
Attorney, Agent, or Firm—Bernard Francis Crowe

[57] ABSTRACT

A zinc-rich coating for use on metallic substrates contains particulate zinc, thermoplastic polyhydroxyether and zinc phosphosilicate.

10 Claims, No Drawings

MODIFIED ZINC-RICH COATINGS

BACKGROUND OF THE INVENTION

This invention pertains to modified zinc-rich coatings and more particularly to those containing thermoplastic polyhydroxyether and zinc phosphosilicate.

Zinc-rich coatings for metallic substrates have increased in importance as replacements for paints containing toxic pigments based on lead or chromium compounds, such as red lead and zinc chromate pigmented paints. The performance of zinc-rich coatings applied directly on cold-rolled steel, however, is not completely satisfactory for many applications. It is used in combination with a chromium containing wash primer in the automotive industry for one-sided coated steel which is formed into parts and assembled by electrical spot welding. The salt spray resistance of zinc-rich coatings on cold-rolled steel also leaves much room for improvement.

It is therefore an object of this invention to provide zinc-rich coatings having electrical properties suitable for spot welding such as electrical conductance, and the like. In this regard aluminum is unsatisfactory despite its good electrical conductivity in bulk because its surface resistance is high due to oxidation under ambient conditions producing a tenacious oxide coating. As a result, aluminum powder has poor electrical conductance and high volume resistivity when used as a pigment in metal coatings.

It is a further object of this invention to provide metal coatings having good corrosion resistance, particularly on cold-rolled steel.

SUMMARY OF THE INVENTION

A satisfactory metal coating composition having excellent electrical properties and corrosion resistance has been provided by a composition comprising:

(A) a thermoplastic polyhydroxyether reaction product of substantially equimolar amounts of a polynuclear dihydric phenol and epichlorohydrin, said thermoplastic polyhydroxyether having a degree of polymerization of at least about 80;

(B) about 300 to about 1100 parts by weight, per hundred parts of polyhydroxyether, of zinc pigment;

(C) about 80 to about 300 parts by weight, per hundred parts of polyhydroxyether, of zinc phosphosilicate;

(D) 0 to about 35 parts by weight, per hundred parts of polyhydroxyether, of a heat hardened resole phenol-aldehyde condensation resin; and (E) 0 to about 15 parts by weight, per hundred parts of polyhydroxyether, of a suspending agent.

The term "thermoplastic polyhydroxyether" herein refers to substantially linear polymers having the general formula:

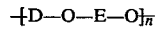

wherein D is the radical residuum of a dihydric phenol, E is an hydroxyl containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced Viscosity} = \frac{t_s - t_o}{ct_o}$$

wherein $t_o$ is the efflux time of the solvent (tetrahydrofuran, $t_s$ is the efflux time of the poly(hydroxyether) solution, c is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear phenol such as those having the general formula:

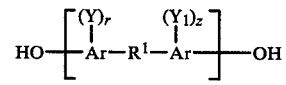

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example

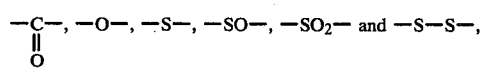

and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl) alkanes such as 2,2-bis(4-hydroxyphenol)propane, 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl ethane, 1,2-bis(4-hydroxyphenyl)ethane, 1,1-bis(4-hydroxy-2-chlorophenyl)ethane, 1,1-bis-(3-methyl-4-hydroxyphenyl)ethane, 1,3-bis(3-methyl-4-hydroxyphenyl)propane, 2,2-bis(3-phenyl-4-hydroxyphenyl)propane, 2,2- bis(3-isopropyl-4-hydroxyphenyl)propane, 2,2-bis(2-isopropyl-4-hydroxyphenyl)propane, 2,2-bis-(4-hydroxylnaphthyl)propane, 2,2-bis(4-hydroxyphenyl)pentane, 3,3-bis(4-hydroxyphenyl)pentane, 2,2-bis(4-hydroxyphenyl)heptane, bis(4-hydroxyphenyl)phenylmethane, bis(4-hydroxyphenyl)cyclohexylmethane, 1,2-bis(4-hydroxyphenyl-1,2-bis(phenyl)propane, 2,2-bis(4-hydroxyphenyl)-1-phenyl-propane and the like;

Di(hydroxyphenyl)sulfones such as bis(4-hydroxyphenyl)sulfone, 2,4′-dihydroxydiphenyl sulfone, 5′-chloro-2,4′-dihydroxydiphenyl sulfone, 5′-chloro-4,4′-dihydroxydiphenyl sulfone and the like;

Di(hydroxyphenyl)ethers such as bis(4-hydroxyphenyl)ether, the 4,3′-, 4,2′-, 2,2′-, 2,3′-, dihydroxydiphenyl ethers, 4,4′-dihydroxy-2,6-dimethyldiphenyl ether, bis(4-hydroxy-3-isobutylphenyl)ether, bis(4-hydroxy-3-isopropylphenyl)ether, bis(4-hydroxy-3-chlorophenyl)ether, bis(4-hydroxy-3-fluorophenyl)ether, bis(4-hydroxy-3-bromophenyl)ether, bis(4-hydroxynaphthyl)ether, bis(4-hydroxy-3-chloronaphthylether, bis(2-hydroxydiphenyl)ether, 4,4′-dihydroxy-2,6-dimethoxydiphenyl ether, 4,4′-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

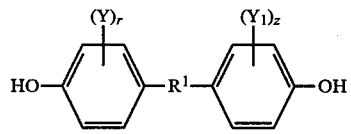

wherein Y and $Y_1$ are as previously defined, r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms, thus,

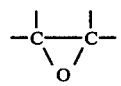

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., —C≡C—, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

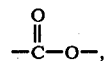

carbonyl oxygen

and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexylmethyl)phthalate, 6-methyl-3,4-epoxycyclohexylmethyl-6-methyl-3,4-epoxycyclohexane carboxylate, 2-chloro-3,4-epoxycylohexylmethyl-2-chloro-3,4-epoxycyclohexanecarboxylate, diglycidyl ether, bis(2,3-epoxycyclopentyl)ether, 1,5-pentanediol bis(4-methyl-3,4-epoxycyclohexylmethyl)ether, bis(2,3-epoxy-2-ethylhexyl)adipate, diglycidyl maleate, diglycidyl phthalate, 3-oxatetracyclo[4.4.0.1$^{7,10}$.0$^{2,4}$]-undec-8-yl 2,3-epoxypropyl ether, bis(2,3-epoxycyclopentyl)sulfone, bis(3,4-epoxyhexoxypropyl)sulfone, 2,2′-sulfonyldiethyl, bis(2,3-epoxycyclopentanecarboxylate), 3-oxatetracyclo[4.4.0.1$^{7,10}$.0$^{2,4}$]-undec-8-yl 2,3-epoxybutyrate, 4-pentenal-di-(6-methyl-3,4-epoxycyclohexylmethyl)acetal, ethylene glycol bis(9,10-epoxystearate), diglycidyl carbonate, bis(2,3-epoxybutylphenyl)-2-ethylhexyl phosphate, diepoxydioxane, butadiene dioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping:

wherein A is an electron donating substituent such as:

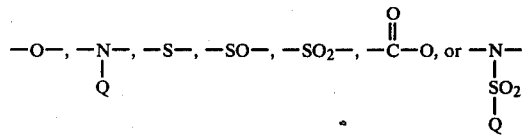

and Q is a saturated hydrocarbon radical such as an alkyl, cycloalkyl, aryl or aralkyl radical.

The zinc pigment used in this invention is commercially available and preferrably has a particle size of about 2 to about 15 microns.

Zinc phosphosilicate is available as a white pigment from Halox Pigments, a Division of Hammond Lead Products Company, Inc., Pittsburgh, Pa. under the trade designation Halox ZX-111.

The resole phenol-aldehyde condensation products which can be used in this invention are produced by the condensation of phenols and aldehydes under alkaline conditions. A resole produced by the condensation of a phenol with formaldehyde most likely proceeds through an intermediate having the following illustrated type structure:

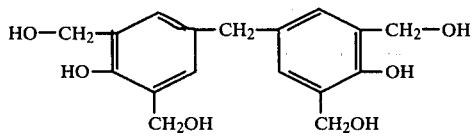

In a typical synthesis, resoles are prepared by heating one mole of phenol with about 1.5 moles of formaldehyde using sodium or barium hydroxide as a catalyst, although any phenolic compound, or a mixture of phenolic compounds having two or three reactive aromatic ring hydrogen positions, can be used with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, recorcinol, hydroquinone, naphthol, 2,2-bis(p-hydroxyphenol)propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are methylene engendering agents such as hexamethylenetetramine, and are contemplated as useful for preparing the resole resins in this invention.

The condensation of phenolic compound and aldehyde, can of course, be conducted in the presence of other alkaline reagents such as sodium carbonate, sodium acetate, potassium hydroxide, ammonium hydroxide and the like, if desired. When the condensation reaction is completed, if desired, the water and other volatile materials can be removed by distillation, and the catalyst neutralized.

The most suitable resole resins are those which are brought to an advanced state of cure, commonly called the "B" stage, but are still heat-reactive. These resins are insoluble in water, readily soluble in conventional organic solvents such as methyl ethyl ketone, acetone, methanol, ethanol, and the like. Resole resins having a particularly desirable combination of properties are those which have an average molecular weight in the range between about 350 and 600.

Where suspending agents are used their nature is not critical and thus one can employ low molecular weight polyolefins, silane treated pyrogenic silica, quarternary, amine treated hydrous magnesium aluminum silicate, and the like.

Suitable solvents are used in applying the coating composition to the particular metallic substrate. The solvents used depend upon the nature of the application method. Thus for example, in spray coating it has been found useful to employ a mixture containing an aliphatic ketone having about 3 to 6 carbons and aromatic hydrocarbons containing about 7 to 9 carbons plus optional aliphatic alcohols containing about 3 to 5 carbons, and the like. For roller-type applications one can use a mixture of Cellosolve acetate and aromatic hydrocarbons containing 7 to 12 carbons, and the like. It is convenient to use glycol esters such as Cellosolve acetate, (the acetate of a monoalkyl glycol ether sold under the Trademark Cellosolve by Union Carbide Corporation). Phenoxy is a trade designation of Union Carbide Corporation for thermoplastic polyhydroxyether having the molecular structure:

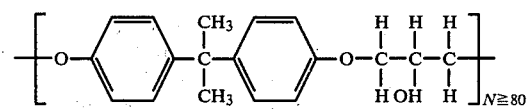

derived from bisphenol-A and epichlorohydrin. This phenoxy resin is available in pellet form and is readily soluble in a variety of solvents and solvent blends. The solid phenoxy resin sold under the designation PKHH by Union Carbide Corporation is soluble in the following solvents: Butyl Carbitol, Butyl Carbitol acetate, Butyl Cellosolve, Carbitol Solvent, Cellosolve acetate, Cellosolve Solvent, Diacetone alcohol, Diethyl Carbitol, Dimethylformamide, Dimethyl sulfoxide, Dioxane, Ethoxy triglycol, Mesityl oxide, Methyl Cellosolve acetate, Methyl ethyl ketone and Tetrahydrofuran.

Carbitol is a Trademark of Union Carbide Corporation for the monoalkyl ether of diethylene glycol.

It was quite surprising to find that zinc phosphosilicate was unique among a number of known pigments in providing a coating composition with particulate zinc and phenoxy to improve the coating performance on untreated cold-rolled steel. A comparison of pigment modified zinc-rich coatings in salt spray resistance is shown in Table I where the formulations also contain a phenolic aldehyde resole resin and a suspending agent together with Cellosolve acetate as a solvent. From these data it can be seen that only the zinc phosphosilicate gave outstanding exposure resistance to salt spray.

TABLE I

COMPARISON OF PIGMENT-MODIFIED ZINC-RICH COATINGS-SALT SPRAY RESISTANCE

|  | Run No. | | | | | | | |
| --- | --- | --- | --- | --- | --- | --- | --- | --- |
|  | 1 | 2 | 3 | 4 | 5 | 6 | 7 | 8 |
| Phenoxy PKHH[1] | 120 | 120 | 120 | 120 | 120 | 120 | 120 | 120 |
| Phenolic BKR-2620[1] | 30 | 30 | 30 | 30 | 30 | 30 | 30 | 30 |
| Suspending Agent MPA-60 | 4.7 | 4.7 | 4.7 | 4.7 | 4.7 | 4.7 | 4.7 | 4.7 |
| Zinc Pigment | 315 | 236 | 236 | 236 | 236 | 236 | 236 | 236 |
| Zinc Phosphosilicate |  | 65.2 |  |  |  |  |  |  |
| Zinc Phosphate |  |  | 79 |  |  |  |  |  |
| Calcium Borosilicate |  |  |  | 65.2 |  |  |  |  |

TABLE I-continued
COMPARISON OF PIGMENT-MODIFIED ZINC-RICH COATINGS-SALT SPRAY RESISTANCE

| | | Run No. | | | | | | | |
|---|---|---|---|---|---|---|---|---|---|
| | | 1 | 2 | 3 | 4 | 5 | 6 | 7 | 8 |
| Barium Metaborate | | | | | | 82.8 | | | |
| Zinc Molybdate | | | | | | | 127 | | |
| Calcium Zinc Molybdate | | | | | | | | 75.3 | |
| Zinc Phospho Oxide | | | | | | | | | 101.8 |
| Pigment Content—Solids-Wt. % | | 91 | 91 | 91 | 91 | 91 | 92 | 91 | 91 |
| Modifying Pigment —Solids-Wt. % | | 0 | 20 | 23 | 20 | 24 | 32 | 22 | 28 |
| Coating Thickness-Dry (mils) | | 1.0 | 1.2 | 1.4 | 1.2 | 1.5 | 1.5 | 1.2 | 1.6 |
| Salt Spray[2] Rating | | | | | | | | | |
| Exposure 100 hours | Blisters | 8MD | none | 8F | 8F | 8F | 6MD | 6MD | — |
| | Corrosion | 6 | 10 | 9 | 8 | 10 | 4 | 7 | 4 |
| 250 hours | Blisters | 8MD | none | 8F | 8F | 8M | 6MD | 6MD | — |
| | Corrosion | 4 | 10 | 8 | 7 | 8 | 4 | 7 | 3 |
| 350 hours | Blisters | 8MD | 8F | 8F | 8M | 8M | 6MD | 6MD | — |
| | Corrosion | 3 | 9 | 7 | 7 | 7 | 3 | 7 | 2 |

[1]Dissolved in Cellosolve acetate (21% solids).
[2]Salt spray ASTM B-117.
[3]Applied to cold-rolled steel.
[4]Baked 350° F./20 minutes.

The electrical properties of pigments were measured with a General Radio 1644 A Megohm Bridge. The test cell was made from polystyrene Petri dishes with covers. Top and bottom dishes were each centrally drilled for number four brass screws and washers with 10 mil copper disks which function as electrodes. The lower dish has an internal diameter of 8.7 cm.

The electrical properties of several pigments are compared with zinc phosphosilicate. These data in Table II demonstrate that zinc phosphosilicate has the lowest volume resistivity which permits welding of the coated metallic substrates such as cold-rolled steel.

TABLE II
ELECTRICAL PROPERTIES OF PIGMENTS

| | Volume (1) Resistivity | (2) |
|---|---|---|
| Conductive Carbon Black | $<1.3 \times 10^1$ | $<4.5 \times 10^4$ |
| Zinc Phosphosilicate | $1.8 \times 10^5$ | $6.3 \times 10^8$ |
| Zinc Dust L-15 | $5.8 \times 10^6$ | $2.0 \times 10^{10}$ |
| Calcium Phosphosilicate | $2.7 \times 10^7$ | $9.4 \times 10^{10}$ |
| Calcium Borosilicate | $2.4 \times 10^7$ | $8.4 \times 10^{10}$ |
| Red Iron Oxide | $1.5 \times 10^7$ | $5.2 \times 10^{10}$ |
| Di-iron Phosphide | $1.1 \times 10^8$ | $3.8 \times 10^{11}$ |
| Micaceous Iron Oxide | $1.7 \times 10^8$ | $5.9 \times 10^{11}$ |
| Zinc Borate | $2.0 \times 10^9$ | $7.0 \times 10^{12}$ |
| Zinc Phosphate | $2.1 \times 10^9$ | $7.4 \times 10^{12}$ |
| Talc | $>10^{12}$ | $>10^{15}$ |
| Atomized Aluminum Powder | $>10^{12}$ | $>10^{15}$ |

(1) ohms/cm³ - Petri Dish Test Cell at 20 volts with General Radio 1644A Megohm Bridge.
(2) ASTM D-257 ohm-cm.

The invention is further described in the examples which follow. All parts and percentages are by weight unless otherwise specified.

EXAMPLE 1
Sea Water Immersion Comparison

Two compositions were prepared identical except for the presence or absence of zinc phosphosilicate. As can be seen from the table below, the sea water immersion tests were passed only by the composition containing zinc phosphosilicate, whereas the control having none of this pigment was inferior.

TABLE III
SEAWATER IMMERSION COMPARISON

| | (1) | (2) |
|---|---|---|
| Phenoxy PKHH[1] | 120 | 120 |
| Phenolic BKR-2620[1] | 30 | 30 |
| Suspending Agent MPA-60 | 4.7 | 4.7 |
| Zinc Pigment | 315 | 236 |
| Zinc Phosphisilicate | | 65.2 |
| Coating Thickness Dry (mils) | 0.5 | 0.5 |
| Seawater Immersion[2] | | |
| Exposure 1,000 hours | | |
| Blisters | 8D | 8F |
| Corrosion | 4 | 10 |

[1]Dissolved in Cellosolve acetate 21% solids.
[2]ASTM-D-1141, 115° F. test temperature.
[3]Substrate cold-rolled steel.
[4]Baked 350° F./20 minutes.

EXAMPLE 2
Salt Spray Ratings of Pigmented Coatings

The compositions in the table below demonstrate the necessity for having both particulate zinc and zinc phosphosilicate pigment present in the compositions of this invention. Despite the use of five (5) ranges of the zinc phosphosphilicate, the salt spray rating tests were all unsatisfactory.

TABLE IV

| | (1) | (2) | (3) | (4) | (5) |
|---|---|---|---|---|---|
| Phenoxy PKHH[1] | 120 | 120 | 120 | 120 | 120 |
| Phenolic BKR-2620[1] | 30 | 30 | 30 | 30 | 30 |
| Suspending Agent | 2.2 | 2.2 | 2.2 | 2.2 | 2.2 |
| Zinc Phosphosilicate | 80.7 | 103.1 | 117.1 | 153 | 185.4 |
| Pigment Volume-% | 54 | 60 | 63 | 69 | 73 |
| Pigment Weight-% | 71.9 | 76.6 | 78.8 | 82.9 | 85.5 |
| Salt Spray[2] Rating | | | | | |
| Exposure 100 hours | | | | | |
| Blisters | 0 | 0 | 0 | 0 | 0 |
| Corrosion | 0 | 0 | 0 | 0 | 0 |

[1]Dissolved in Cellosolve acetate (21% solids).
[2]Salt spray ASTM B-117.
[3]Applied to cold-rolled steel. Baked 350° F./20 minutes.

The coatings are rated according to the code shown below.
10—No change
9—Very slight change
8—Slight change
7—Medium plus 6—Medium
5—Medium minus
4—Slightly bad
3—Bad
2—Very bad
1—Partial failure
0—Failure.

The corrosion test blisters were rated F=few, M=medium, and D=dense. Further details may be found in ASTM D-714.

EXAMPLE 3

Welding Properties of Zinc Primer Compositions

The data presented in the table below demonstrate that in either coating to coating or metal to metal composites both zinc and zinc phosphosilicate are necessary in a phenoxy based steel coating composition.

The data in Table V compares a zinc-pigmented coating against a zinc phosphosilicate coating (formula at Table I, Run No. 2) and shows that the zinc phosphosilicate modifier does not degrade welding properties but rather provides improvements. The welding properties were determined with a 15 kva spot welder equipped with a current coil placed over the arm of one electrode holder and connected to a recording oscillograph. This permitted recording the 50 hertz wave form of the welding current. Examination of the welding trace permitted a determination of how rapidly the welding current reaches the maximum value. This generally occurs within the first half cycle for weldable coatings. In order to compare similar coatings, the magnitudes of the first and maximum amplitude half wave (second wave) were measured and a calculated value which was expressed as a percent of the maximum sine wave. The higher values indicated good welding properties.

TABLE V
WELDING PROPERTIES OF EXPERIMENTAL PHENOXY COATINGS

| Coating | Thickness mil | Composite | Sine Wave % |
|---|---|---|---|
| Uncoated Steel | — | M/M | 93 |
| Zinc | 0.5 | M/M | 89 |
| Zinc | 0.5 | C/C | 86 |
| Zinc | 0.9 | M/M | 91 |
| Zinc | 0.9 | C/C | 50 |
| Zinc/ZPS | 0.5 | M/M | 90 |
| Zinc/ZPS | 0.5 | C/C | 96 |
| Zinc/ZPS | 0.9 | M/M | 88 |
| Zinc/ZPS | 0.9 | C/C | 91 |

ZPS—zinc phosphosilicate.
M/M—metal-to-metal.
C/C—coating-to-coating.

EXAMPLE 4

Preparation of Thermoplastic Polyhydroxyether

The thermoplastic polyhydroxyether used was prepared by the reaction of equimolar amounts of 2,2-bis(4-hydroxyphenyl)propane and epichlorohydrin together with sodium hydroxide. Equipment used was a vessel provided with an agitator, thermometer, and reflux means. There was placed in the vessel:

| | Parts |
|---|---|
| 2,2-bis(4-hydroxyphenol)propane | 114.5 |
| Epichlorohydrin (99.1%) pure | 46.8 |
| Ethanol | 96.0 |
| Butanol | 10.0 |

| -continued | |
|---|---|
| | Parts |
| Sodium hydroxide (97.5%) pure | 22.6 |
| Water | 70.0 |

The above mixture was stirred at room temperature for 16 hours to accomplish the initial coupling reaction. The mixture was then heated at 80° C. for one hour. Sixty (60) parts of a 7:3 mixture of toluene:butanol was added to the vessel. Heating of the mixture at 80° C. was continued another two hours. There was added to the vessel an additional 50 parts of the 7:3 toluene:butanol mixture and 4.5 parts of phenol. The contents of the vessel were maintained at 80° C. (reflux) for 2.5 hours. Upon cooling, the reaction mixture was diluted with 200 parts of the 7:3 toluene:butanol mixture. One hundred parts of water was added to the vessel and the contents agitated to dissolve salts present in the reaction mixture. The vessel contents were allowed to settle for 10 minutes during which time a lower brine phase formed. The lower phase was separated by decantation. The upper polymer solution containing phase was washed successively with two 160 part portions of water and a mixture of 85% phosphoric acid with 100 parts of water (pH=2) for one hour. The upper polymer solution phase was again separated by decantation and water washed with four successive 200 part portions of water containing 4.5% butanol. The washed polymer was then coagulated in isopropanol, filtered and dried.

The polyhydroxyether could then be dissolved in the desired solvent for further use.

The chemical analysis of the zinc phosphosilicate used in this invention is presented below:

| | |
|---|---|
| $P_2O_5$ | 8.9% |
| $SiO_2$ | 46.5% |
| ZnO | 10.2 |
| $Al_2O_3$ | 17.8% |
| CaO | 0.5% |
| $Na_2O$ | 7.5% |
| $K_2O$ | 3.5% |
| Loss on ignition | 4.6% |
| Loss on drying | 0.5% |
| | 100.0% |

Although the invention has been described with a certain degree of particularity, it is understood that the present disclosure of the preferred forms has been made only by way of example and that numerous changes can be made without departing from the spirit and scope of the invention.

What is claimed is:

1. Corrosion resistant article comprising a metallic substrate and adhering thereto as a coating a composition comprising:
   (A) a thermoplastic polyhydroxyether reaction product of substantially equimolar amounts of a polynuclear dihydric phenol and epichlorohydrin, said thermoplastic polyhydroxyether having a degree of polymerization of at least about 80;
   (B) about 300 to about 1100 parts by weight, per 100 parts of polyhydroxyether, of zinc pigment;
   (C) about 80 to about 300 parts by weight, per 100 parts of polyhydroxyether, of zinc phosphosilicate;

(D) 0 to about 35 parts by weight, per 100 parts of polyhydroxyether, of a heat hardened resole phenol-aldehyde condensation resin; and (E) 0 to about 15 parts by weight, per 100 parts of polyhydroxyether, of a suspending agent.

2. Article claimed in claim 1 wherein the polynuclear dihydric phenol is 2,2-bis(4-hydroxyphenyl)propane.

3. Coating composition comprising:

(A) a thermoplastic polyhydroxyether reaction product of substantially equimolar amounts of a polynuclear dihydric phenol and epichlorohydrin, said thermoplastic polyhydroxyether having a degree of polymerization of at least about 80;

(B) about 300 to about 1100 parts by weight, per 100 parts of polyhydroxyether, of zinc pigment;

(C) about 80 to about 300 parts by weight, per 100 parts of polyhydroxyether, of zinc phosphosilicate;

(D) 0 to about 35 parts by weight, per 100 parts of polyhydroxyether, of a heat hardened resole phenol-aldehyde condensation resin; and (E) 0 to about 15 parts by weight, per 100 parts of polyhydroxyether, of a suspending agent.

4. Composition claimed in claim 3 containing about 110 to about 220 parts by weight of zinc phosphosilicate.

5. Composition claimed in claim 3 containing about 20 to about 30 parts by weight of resole phenol-aldehyde condensation resin.

6. Composition claimed in claim 1 containing about 5 to about 10 parts by weight of a suspending agent.

7. Composition claimed in claim 1 wherein the polynuclear dihydric phenol is 2,2-bis(4-hydroxyphenyl)propane.

8. Composition claimed in claim 1 dissolved in a glycol ester.

9. Composition claimed in claim 8 wherein the glycol ester is Cellosolve acetate.

10. Composition claimed in claim 1 dissolved in a mixture of an aliphatic ketone containing 3 to 6 carbons, an aromatic hydrocarbon containing 7 to 9 carbons and an aliphatic alcohol containing 3 to 5 carbons.

* * * * *

UNITED STATES PATENT AND TRADEMARK OFFICE
CERTIFICATE OF CORRECTION

PATENT NO. : 4,370,382
DATED : January 25, 1983
INVENTOR(S) : George A. Salensky It is certified that error appears in the above—identified patent and that said Letters Patent is hereby corrected as shown below:

At Column 12, claims 6,7 and 8, line 1 of each, delete the numeral "1" and substitute therefor the numeral --3--.

Signed and Sealed this

Twelfth Day of April 1983

[SEAL]

Attest:

GERALD J. MOSSINGHOFF

Attesting Officer     Commissioner of Patents and Trademarks